United States Patent [19]

Knibiehler et al.

[11] 4,389,709
[45] Jun. 21, 1983

[54] PROGRAMMABLE INDICATOR SYSTEM

[75] Inventors: Ernst Knibiehler, Basel; Georg Hirmann, Zürich, both of Switzerland

[73] Assignee: Mobil Oil Corporation, New York, N.Y.

[21] Appl. No.: 195,033

[22] Filed: Oct. 8, 1980

[30] Foreign Application Priority Data

Oct. 3, 1979 [CH] Switzerland ............... 8910/79

[51] Int. Cl.³ .............................................. G06M 3/02
[52] U.S. Cl. .................................... 364/551; 340/680; 377/15; 377/16
[58] Field of Search ............... 364/551, 552, 569, 571, 364/167, 170, 474; 318/572, 603, 632; 235/92 MT, 92 T; 340/52 D, 680, 309.1

[56] References Cited

U.S. PATENT DOCUMENTS

| | | | |
|---|---|---|---|
| 2,946,646 | 7/1960 | Bower et al. | 346/33 |
| 3,275,987 | 9/1966 | Mann | 340/147 |
| 3,546,693 | 10/1967 | Bissett et al. | 340/309.1 |
| 3,559,188 | 1/1971 | Proctor | 364/167 |
| 3,603,880 | 9/1971 | Brecker, Jr. et al. | 324/182 |
| 3,864,560 | 2/1975 | Dening | 364/552 |
| 3,938,128 | 2/1976 | Pidsosny | 340/309.1 |
| 4,135,246 | 1/1979 | McMannis | 364/551 |
| 4,159,531 | 6/1979 | McGrath | 340/52 D |
| 4,208,718 | 6/1980 | Chung | 364/474 |
| 4,237,371 | 12/1980 | Le Bouder | 235/92 T |
| 4,245,316 | 1/1981 | Koikawa et al. | 364/167 |
| 4,260,986 | 4/1981 | Kobayashi et al. | 340/680 |
| 4,276,468 | 6/1981 | Nagamoto et al. | 235/92 MT |

Primary Examiner—Gary Chin
Attorney, Agent, or Firm—Charles A. Huggett; Michael G. Gilman; Frank J. Kowalski

[57] ABSTRACT

A system is described for indicating the appropriate time to perform preventive maintenance operations upon a machine tool. The system includes a signal generator which is to be connected to the machine tool to generate signals whenever the tool is in operation. These signals are integrated and a threshold sensitive detector responsive to the output of the integrator produces a control signal. The control signal is then applied to a audio/visual indicating means to notify operators of the advent of a particular preventive maintenance operation to be performed upon the machine tool.

3 Claims, 6 Drawing Figures

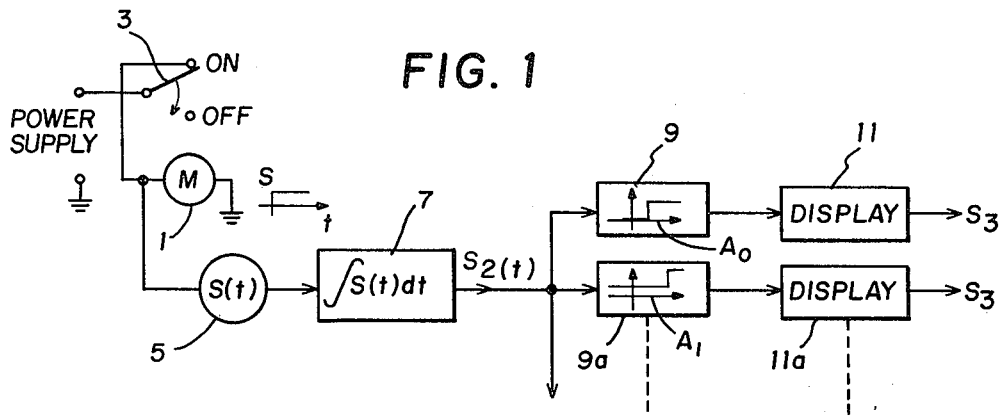
FIG. 1
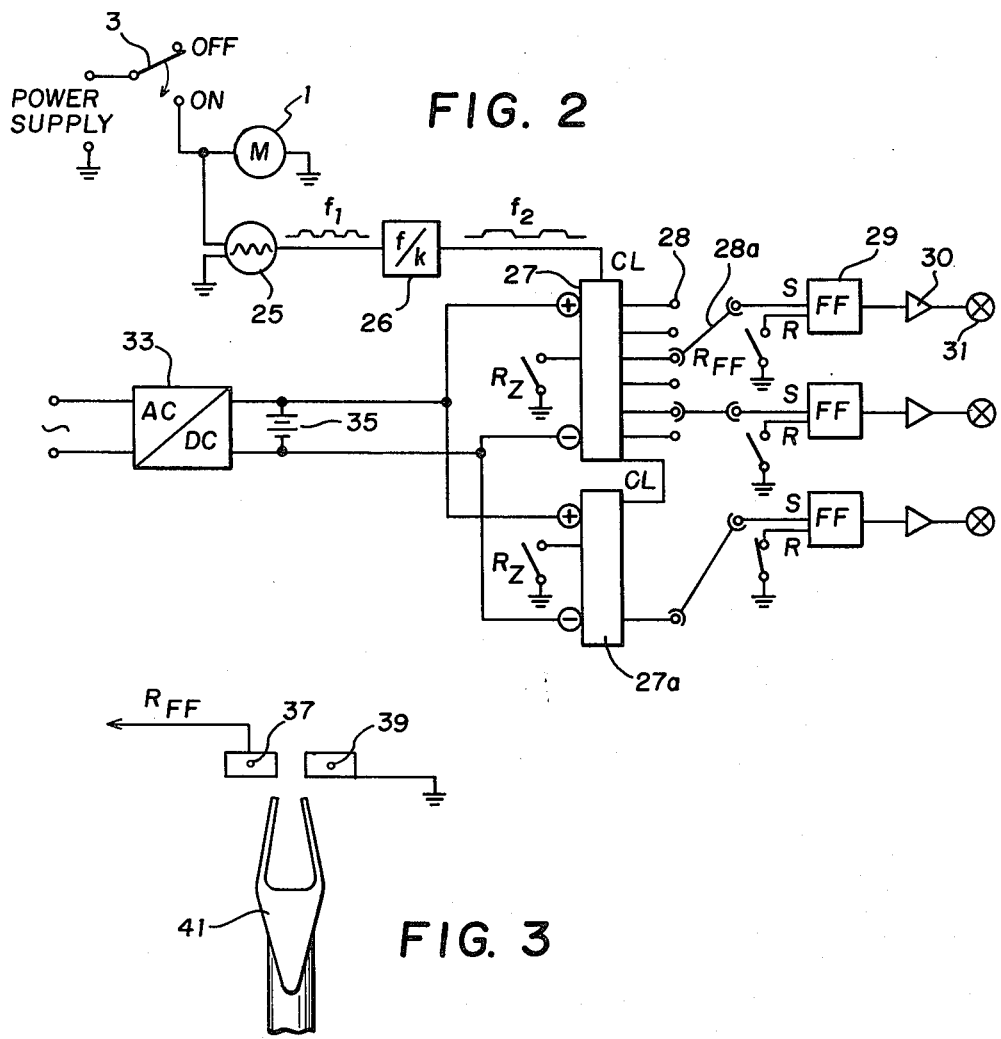
FIG. 2
FIG. 3

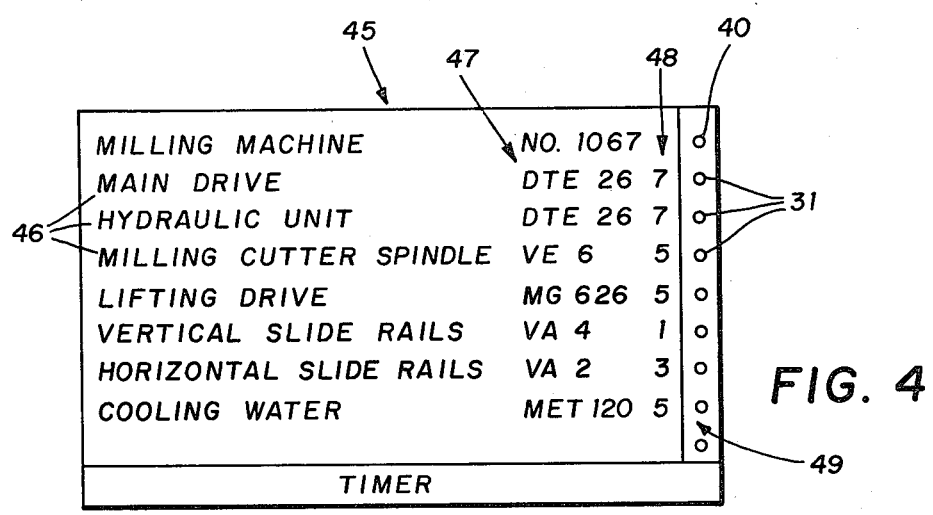
FIG. 4
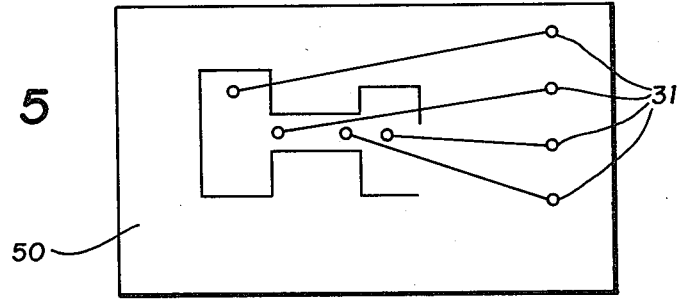
FIG. 5
FIG. 6
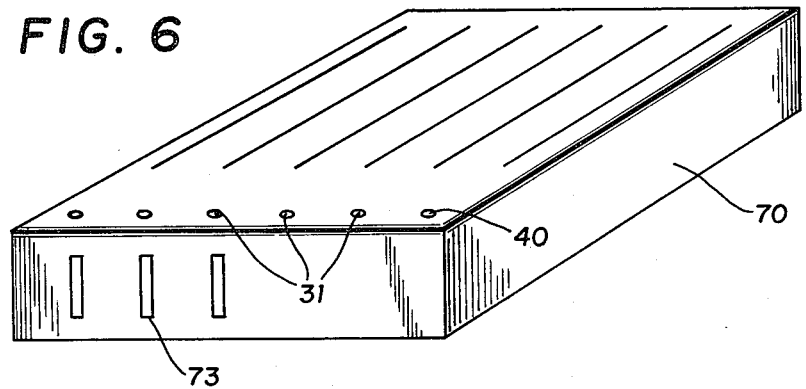

PROGRAMMABLE INDICATOR SYSTEM

FIELD OF THE INVENTION

This invention relates to a programmable system for indicating the appropriate time to perform preventive maintenance operations upon components of a machine or machine system.

BACKGROUND OF THE INVENTION

It is customary in industry to lubricate machines according to a pre-established lubricating plan. The monitoring of such lubricating plans has been carried out by means or graphs or time charts which presuppose high reliability on the part of those responsible for the monitoring.

It is furthermore known to monitor lubricating plans by means of programmed cards and computers. This monitoring, however, is expensive, especially for small organizations. Consequently, there is a demand in the industry for a fool-proof signal-generating device, in particular a warning device, which obviates the need for human monitoring and which addresses itself directly to the appropriate implementing organization, by means of appropriate signals.

SUMMARY OF THE INVENTION

The present invention, whose purpose consists in the creation of a programmable indicator that is simple in construction, inexpensive, fool-proof, easily understood but nevertheless practical and reliable, distinguishes itself according to the invention in that there is provided a signal generator that is activated within time periods to be monitored on a device, connected with an integrating element that follows it, wherein the output of the element is at least connectable with at least one threshhold-sensitive or time-unit-sensitive state indicator.

Such programmable indicators are particularly appropriate for utilization on machine tools where a signal generator produces signals whenever the tool is in operation. The signals are accumulated by an integrator whose output is sensed by a threshhold sensitive device to produce a control signal indicating the advent of a particular preventive maintenance operation.

In a preferred embodiment the signal generator produces pulses applied to a binary ripple counter tapped at different points each representing selected time periods. Flip-flops are connected to the tapped counter and respond to control visual devices whose actuation represent the onset of preventive maintenance step.

BRIEF DESCRIPTION OF THE DRAWINGS

FIG. 1 is a schematic generally outlining the principles of the invention;

FIG. 2 is a schematic of a preferred embodiment of the programmable indicating system of the present invention;

FIG. 3 illustrates a preferred form of reset switching device;

FIG. 4 illustrates one form of a textual lubricating plan for controlling the lubrication of a machine tool;

FIG. 5 illustrates a schematic lubricating plan for utilizing in a manner analogous to FIG. 4;

FIG. 6 is a perspective of a housing for containing the indicating system of the present invention.

DETAILED DESCRIPTION OF THE INVENTION

Referring to FIG. 1, a device that is to be monitored with the signal generator, such as a machine 1, is switched on and off by means of an operating switch 3. Generally, the position of switch 3, arranged on the machine 1 to be monitored determines the time periods to be monitored. If the switch is the on/off switch of machine 1, the operating time of that machine is being monitored therewith. As a function of the switching state of switch 3, a signal generator 5 is started or turned off. When the signal generator is switched on it delivers a time-dependant signal S(t), which as shown may be a constant signal level. This output signal is applied to an integrating unit 7 and is there integrated, so that at the output of integrating unit 7 there appears a signal $S_2(t)$. This latter signal is equivalent to the total time span during which generator 5 has been activated; in other words, this is equivalent to the time periods during which machine 1 was in operation and therefore was to be monitored. The output of integrating unit 7 is carried to the inputs of one or more threshhold-sensitive or time-unit-sensitive units 9. In so doing, a first unit may, for instance, produce a signal whenever signal $S_2(t)$ exceeds a threshhold value or a critical total-time value $A_0$, a second unit produces a signal when said signal value exceeds a threshhold value $A_1$, etcetera. The outputs of the threshhold-sensitive units are applied to a series of display units 11.

The display units 11 may be acoustic or visual, and may also be used for the automatic triggering of control processes, as represented by the outputs $S_3$.

The preferred embodiment is illustrated in FIG. 2. There, the signal generator 5 of FIG. 1 is embodied in pulse generator 25. When activated by the closing of switch 3, the pulse generator 25 delivers at its output a pulse sequence with the frequency $f_1$. This frequency depends on the clock frequency of generator 25, on the time periods to be monitored, and on the layout of the integrating unit described below. The output of generator 25 is applied to a frequency divider 26 at whose output appears a pulse train with frequency $f_2$. In the digital structure, represented in FIG. 2, integrating element 7 of FIG. 1, embodied in one or more counter stages 27, which are connected in series as required. The clock signal of frequency $f_2$ is supplied to clock input CL so that successive binary signals appear at the individual counting stages of counter 27, in a known fashion. The individual stages of counter 27 are preferably supplied to connections 28, which connections may be selectively switched by means of bridging pieces 28a to setting-inputs s of flip-flops 29. In this embodiment, the threshhold units or the units for the critical total time values 9 according to FIG. 1 are embodied in the individual counter stages of counter 27 and in the flip-flops 29 connected therewith, in that after a predetermined number of pulses of the pulse train appearing with frequency $f_2$, which numbers correspond to the respective threshhold values $A_0$, $A_1$, $A_2$..., an appropriate counter output 28 is activated and hence the flip-flop 29 connected with it is also set. By means of a drive 30, the flip-flops 29 control the displays, such as the LED's 31, which are the equivalent of the displays 11 of FIG. 1. The flip-flops 29 can be reset by means of the reset switch R which can be operated individually. This makes it possible to extinguish the the appropriate light-emitting diode 31, after the activity carried out after the time-period to be monitored was finished. In practice this operates as an acknowledgement that the required activity had been executed.

The counters 27, 27a etc., flip-flops 29, and the LED's 31, are supplied power via AC-DC converter 33, which provides continuous voltage normal for integrated switching circuits, e.g., 8–12 V. In order to maintain the counter in a state during AC power failures batter 35 is connected across the output of connector 33. In order to reset counter 27, such as in case of an overhaul, the reset inputs of the counters may be activated by means of reset switches $R_z$.

In order to be able to effect the resetting of the individual displays 29 with the least possible effort, the reset inputs of the flip-flops 29 are connected to a first metal contacts such as contact 37 (FIG. 3). In the immediate vicinity of that contact is a second metal contact 39, which in turn is connected to reset potential, e.g., to ground.

The reset switch $R_{FF}$ is made up by both contacts 37 and 39, as well as by a metal object such as special pincers, 41. For resetting purposes, the two contacts 37 and 39 of the flip-flops 29 are connected from outside by use of pincers 41.

FIG. 4 illustrates the possibility of setting up a lubrication plan 45 providing the required data in a textual manner. A column 46 lists the lubricating points of machine 1, one column 47 lists the lubricants to be used for the various lubricating points, one column 48 lists the number of basic time units—e.g., one week—after which lubrication is required. One column 49 represents the LED's provided for the purpose of lighting up after the time has elapsed. In accordance with the number of lubricating points there is a corresponding number of LED's 31. One LED 40 (which may be, for instance, green), located at the top of the monitoring board, can be connected to indicate that generator 25 is operating and thus that the milling machine 1067 is being monitored.

It is also possible to use an illustrational lubricating plan 50, instead of the textual lubricating plan 45. FIG. 5 illustrates such an illustrational plan, on a reduced scale. The figure represents the contour of a machine with four lubricating points, at which are located the related LED's 31.

In accordance with the lubricating plan provided, 45 or 50, for machine tool 1, as is represented as an example in FIGS. 4 and 5, programming is effected with the aid of bridging pieces 28a, which may take the form of printed circuits; these bridging pieces define machine running times, after which the individual lubricating points become due for lubrication in accordance with the lubricating plan. According to the lubricating plan, the first position to be lubricated lights the LED on the fifth line, namely "vertical slide rail", which may have to be lubricated, for example, on a weekly basis or after 40 hours of machine running time. By the same token, the LED for lubricating the horizontal slide rails light up after 3×40, i.e., 120 hours.

The longest running time without requiring lubrication is featured by the main drive and the hydraulic components, which time amounts to 7×40 hours, with both LED's 31 pertaining thereto being connected in parallel and thus lighting up together.

The circuit from pulse generator 25 up to the LED's 31 is located in a closed housing 70 (FIG. 6). On the top side of that housing the appropriate lubricating plan may, for example, be slid in according to FIG. 4, with the pertinent LED 31 following at the end of each line of the text. In FIG. 6 only five lubricating positions are provided. For resetting the flip-flops 29, housing 70 features appropriate lateral slots or openings 73, through which the individual responsible for lubrication may insert his resetting instrument, such as pincers 41, and reset the corresponding flip-flop 29 into its zero position and thus extinguish the pertinent LED 31.

As pulse generator and first frequency divider, a CMOS 45 21 may be used, with a CMOS 40 24 being used as second divider for tapping and a CMOS 40 49 as an inverter to insure the proper flank position. These components are manufactured among others by National, Motorola or RCA. As flip-flops, the FF 40 43 from RCA may be used.

With a pulse length of, for instance, 1.125 seconds at pulse generator 25 (frequency $f_1$) frequencies of hours may be produced in this manner at outputs of counter 27, in a manner that corresponds to the division of frequency $f_1$ at the ratio of $1.125^n$ seconds.

In the case of a machine lubrication program which features sight lubricating points, the last eight stages of the counter 27 are tapped.

The programmable time periods which correspond to the last eight stages of the frequency divider are designed as follows: 40, 80, 160, 320, 640, 1280, 2560 and 5120 hours at a rate of one pulse each 1.125 seconds. The range of adjustment provided is from 50% to 200%.

By exchanging the appropriate bridging pieces 28a another lubricating plan can be programmed.

Variations of the circuits and devices described herein may be adopted while remaining within the scope of the invention as set forth by the following claims.

What is claimed is:

1. A programmable system for indicating the expiration of appropriate time spans to perform preventive maintenance operations upon a machine tool comprising:

a signal generator adapted to be connected to the machine tool to generate signals whenever the tool is in operation, integrating means connected to said generator to accumulate said signals with at least two threshold sensitive outputs, at least two respectively resettable storage means inter-connected between said outputs and at least two respectively indicator means for indicating the advent of the particular maintenance operations, a programming unit comprising a plurality of switches to selectively connect said indicator means via said storage means to said outputs.

2. The system of claim 1 wherein said integrating means is a pulse counter.

3. The system of claim 2 wherein said pulse counter is a binary ripple counter.

* * * * *